May 17, 1966  J. PARSTORFER  3,251,477
DISPLAY ASSEMBLY

Filed June 5, 1964  3 Sheets-Sheet 1

INVENTOR.
JOHN PARSTORFER.
BY Gerald R. Hibnick
ATTORNEY.

May 17, 1966  J. PARSTORFER  3,251,477
DISPLAY ASSEMBLY

Filed June 5, 1964  3 Sheets-Sheet 2

INVENTOR.
JOHN PARSTORFER.
BY Gerald R. Hibnick
ATTORNEY.

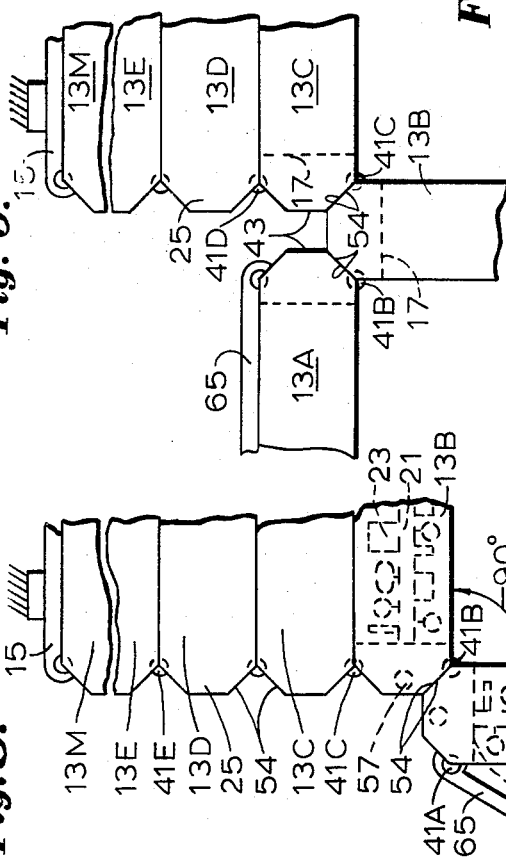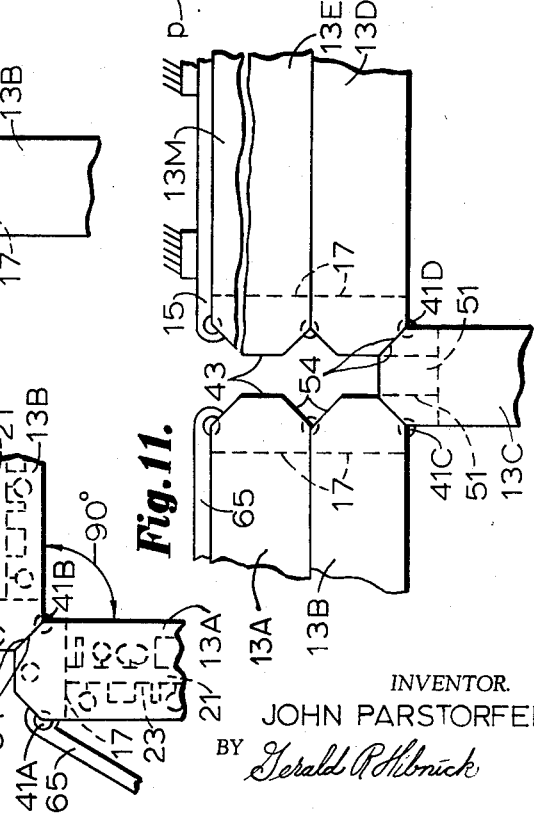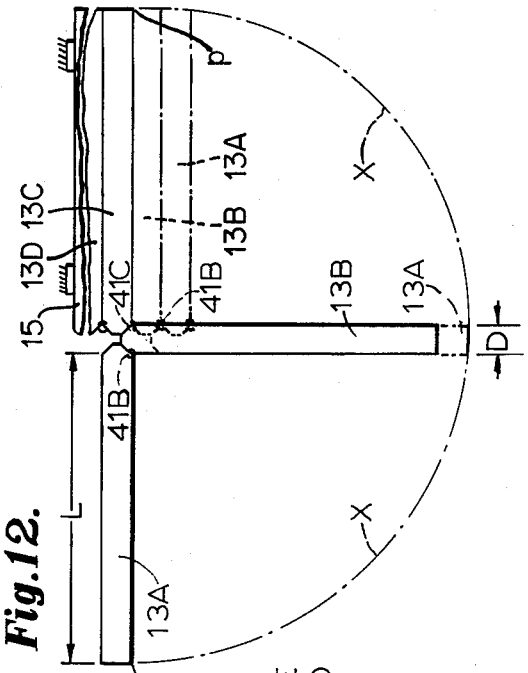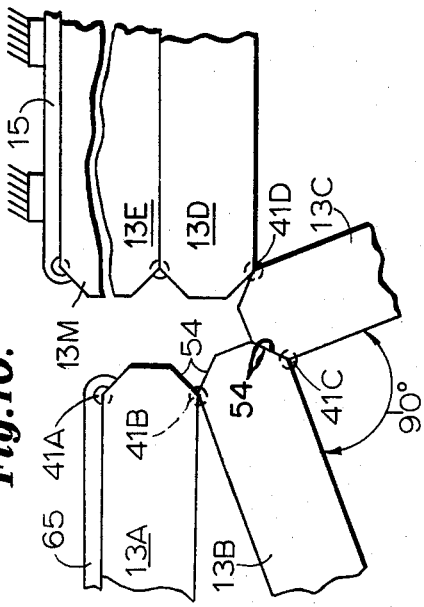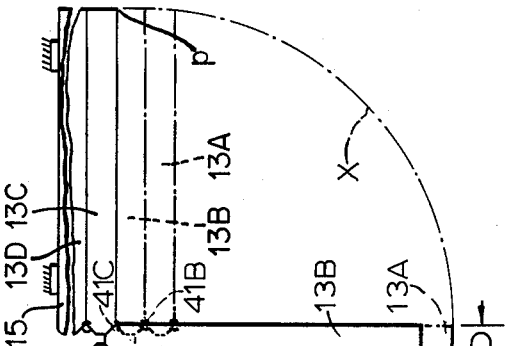

United States Patent Office 3,251,477
Patented May 17, 1966

3,251,477
DISPLAY ASSEMBLY
John Parstorfer, Philadelphia, Pa., assignor to Burroughs Corporation, Detroit, Mich., a corporation of Michigan
Filed June 5, 1964, Ser. No. 372,770
14 Claims. (Cl. 211—169)

This invention relates to a display assembly having a plurality of frames for carrying displayable items in which the frames are movable in relation to one another, as well as in relation to their supporting structure. In particular, this invention is directed to an assembly of display frames electrically intercoupled and housing the electronic components of a computer. The display frames are supported at like edges by the individual links of articulated members with the linkage of said assembly having associated stop means for controlling the arcuate and linear translation of the display frames.

Display devices comprising movable leaves, wings, or frames are well known in the art. They have been used for many years for exhibiting greeting cards, hardware items, clothing, and numerous other commodities. In some display devices the leaves are held together by a flexible webbing as in a book. Other devices have their frames hinged together like a plurality of doors. Still other devices have their wings mounted to conveyors which are driven along a predetermined track.

The first two mentioned display devices typify those in which the wings of the assembly are dependent each from the preceding and the cumulative weight of the assembly is borne by the hinges or other interconnections from one frame directly to the other. The latter-mentioned device is an example of those in which the display wings are controllably translated in serial manner by a motive power but in which there is still little or no cooperation between adjacent wings beyond the fact that they are on a common carrier.

In display assemblies of the prior art where the assembly is mounted at one end and free at the other, allowing a maximum ease of access, the wings or frames have been serially pivoted one to another by conventional hinges. In these arrangements the weight of the assembly was cumulatively borne by the means mounting the individual wings to the hinges. Such assemblies are obviously not appropriate for displays requiring heavier frames for support.

One deficiency common to most displaying devices is the lack of motive cooperation among the display frames. Hence, after one frame has been examined, it is manually transported away from the examining position and then the next frame is grasped and positioned for examination. Not only does this mode of operation require two separate transportational steps, but it also frequently causes the examiner to change positions after examining each frame.

To reduce the above problems, especially in situations where the display frames are large and/or heavy, some display assemblies are provided with motor-operated conveyors. Such assemblies, however, have additional problems accompanying the use of the driven conveyor, such as lack of ease of access, size, weight, expense, maintenance, and lack of mobility due to the fact that the conveyor, especially at both its terminus positions, must be fixed.

The subject display assembly embodies a unique articulated member capable of supporting heavy wings or frames and having motion translating and limiting means, which obviates the above and other problems and provides an easily constructed and maintained, serially linked assembly of display frames capable of modular interchange in which the manual translation of the frame last examined introduces a new frame into the examining position.

Although this display assembly may be used for displaying various types of articles, the embodiments herein described and illustrated are employed for housing modular subassemblies and components of an electronic computer. It is well known to those skilled in the computer art that an essential design criterion is to provide for easy and rapid access to certain portions of a computer's electronic system so that both the initial construction of the computer and its subsequent maintenance, especially while in operation, can be accomplished with facility. The present display assembly is well suited to meet this design criterion.

Accordingly, it is an object of this invention to provide an improved assembly for selectably displaying like units through predetermined display arcs.

Another object of this invention is to provide an improved display assembly of like housings have motion-limiting and force-transmitting means for automatically transporting a succeeding housing into display position as a previously selected housing is being transported out of display position.

Still another object of this invention is to provide an assembly of display frames supported by linkage which improves the stability, mobility and compactness of the assembly as well as the interchangeability of the frame members.

A further object of this invention is to provide linkage for display members, the members and the linkage having associated coactive means which control the positions of the members relative to one another and also relative to a fixture.

The preferred embodiment of the present invention comprises a pair of vertically spaced, articulated members having a plurality of serially joined links, a link from each of the members forming a pair to support a frame or housing. Each of the links has a horizontal tongue on one side and a horizontal groove on the other, the links being joined by pintles for horizontal movement only. Stop means limit to 90° the maximum through which a first link can swing upon one of its pintles before there is an abutting upon the stop means of the next adjacent link. Thereafter, the abutting stop means enable a transmission of motive force from the first link to the next link, such that an attempt to pivot the first link, by its attached housing, further about the pintle causes the second link, with its attached housing, to pivot. The two linkages are each anchored individually at one of their ends so as to extend parallel one to another in a vertical plane as upper and lower supports for a plurality of rectangular display frames, each frame having a depth equal to the distance between the centers of the two pintles in each link.

Each display frame is supported near its top and bottom by fixed mountings to its links, the links extending transversely beyond the depth of the frame such that the display frames are, in effect, serially joined in an upright position somewhat like the leaves of a book. This cooperation between the links of the articulated members and their stop means enables the display frames to be swung serially or in groups through displaying arcs on the independent support members and then to be linearly translated in relation to the display area without the use of a remote power source, as if on a conveyor means. The entire assembly is anchored at only one end, thus facilitating the free translation of its frame members.

The interrelations of the links and housings are such that the housings pivot, one with respect to the next, as if the housings were hinged to each other, and the links of the articulated members are sometimes referred to hereinafter as hinge-links. It should be kept in mind, however, that the housings are individually supported by the articulated members and the weight of no housing is borne by any other housing or its connections to the links of the articulated members.

Other features and objects of this invention will become apparent by reference to the following description and claims taken in conjunction with the accompanying drawings in which:

Figure 1:
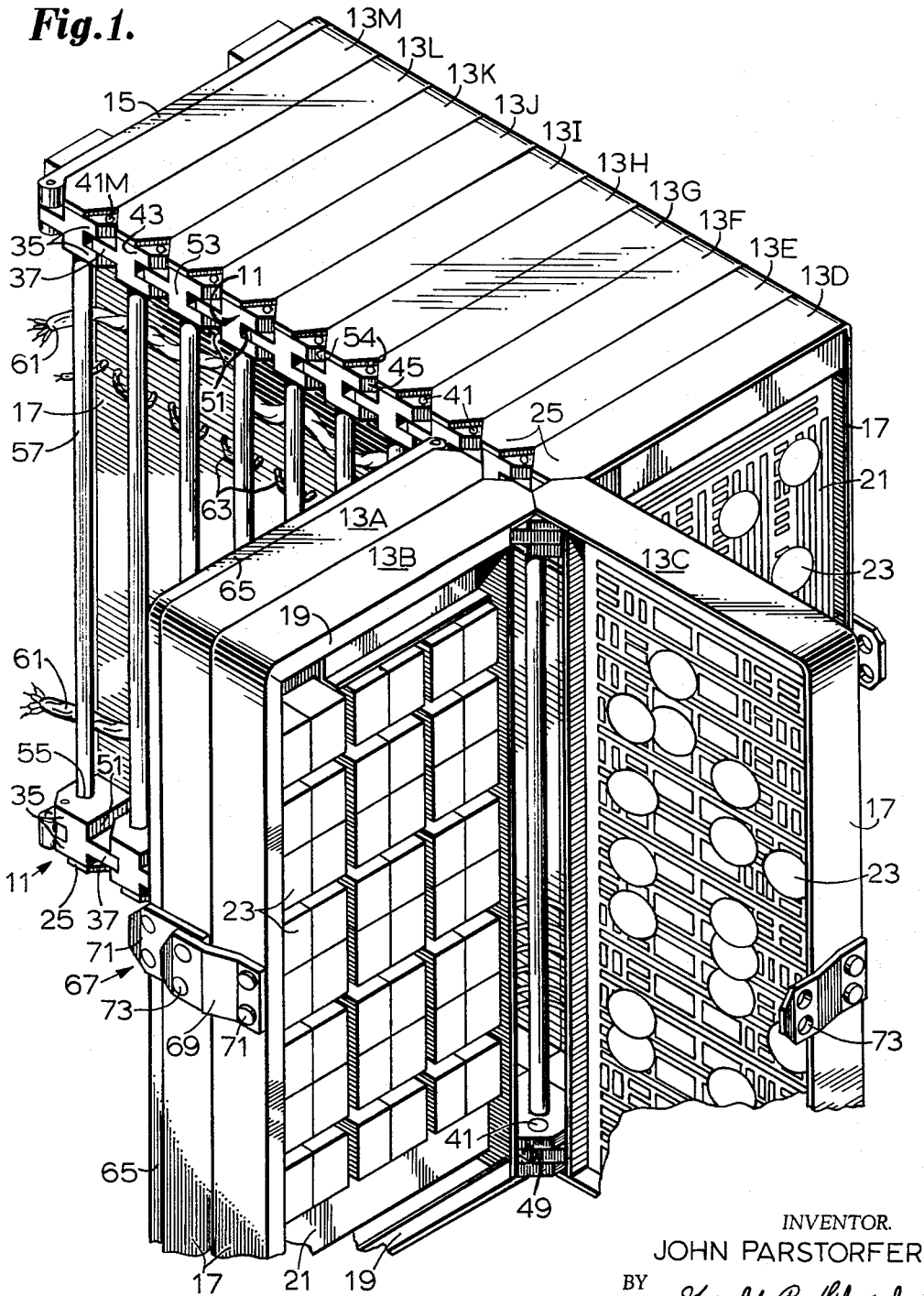
FIG. 1 is a perspective view of the preferred embodiment of this invention showing a pair of articulated members supporting a plurality of display frames, two of which have been transported past the display position and are interlocked, another of which is in the full display position, and several others of which are in the closed unselected position.

FIGS. 7-11 are diagrammatic top views of a plurality of the display frames shown in different positions of accessibility, commencing from the completely closed position through to the position shown in FIG. 1; and FIG. 12 is a diagrammatic top view showing a display frame orientation similar to that of FIG. 9 and further showing in phantom the positions through which the forward two frames pass and the arcuate path followed by a point on the outward edge of the forwardmost frame.

As shown in FIG. 1, the subject display assembly utilizes a pair of vertically spaced apart, articulated members, or assemblies, each composed of a plurality of links 11, as supports for a plurality of display frames 13A–13M. The entire assembly is pivoted by means hereinafter described in more detail to any convenient vertical support not shown. In the illustrated embodiment a rear cover plate 15 has been inserted between the housing 13M and the vertical support, the assembly being pivoted to the cover plate and the plate anchored to the vertical support by any convenient means.

The rear cover plate 15 may be anchored to a wall, posts, cabinetry, or the like. Since it is conventional for computers to be housed in cabinets, it will be assumed that this display assembly is housed in a computer cabinet and that the rear cover plate is anchored to part of that cabinet.

Each display frame 13A–13M comprises a pair of vertical side members 17, and a pair of horizontal end members 19. The vertical and horizontal members 17, 19 have flush sides forming planar display faces. The side and end members may be fabricated and joined by any conventional method to form a hollow framework suitable for the mounting of a panel 21. The panels 21 may be printed circuit boards, plain chassis boards, or a combination thereof. Components and subassemblies 23 may be permanently or removably secured to the panels 21, which may themselves be mounted in various degrees of permanence, depending upon the particular application.

As used herein, the term "rearward" will mean in the direction of the frame 13M and the anchored rear cover plate 15; "forward" will mean in the direction opposite to "rearward"; "inward" will mean toward the vertical side 17 by which the frames are serially mounted; and "outward" will mean opposite to "inward."

Each display frame is fixedly attached to individual links 11 of the upper and lower articulated members utilizing a pair of links for each housing. In the preferred embodiment, as illustrated in FIG. 1, portions of the horizontal ends 19 have been extended inwardly to form a pair of integral lugs 25 which may be attached to the respective upper and lower surfaces of the pair of upper and lower links. Alternatively or additionally, the inward vertical side 17 of the display frames may be attached to sides of links 11, as shown in FIGS. 2–6.

Each link 11 is a unitary structure having a bifurcated end with two similar knuckles 35, forming a horizontal groove, and a tongued end with one horizontal knuckle 37. Eyes or bores 39 are formed in each of the knuckles for the passage therethrough of pintles 41A–41N. The bores 39 are aligned in each link to form a longitudinal axis for the link. The pintles 41 may be seated within the eyes 39 and secured against axial movement by conventional means.

Each link has a leading face 43 extending across the link including the similar knuckles 35 and the tongue 37. The knuckles 35 and 37 have facets 45, 47, and 49. The interior terminations of the knuckles 35 and 37 form abutments or walls 51 which define the central body portion 53 of each link 11 and the innermost surface of the horizontal groove. The walls 51 adjacent the knuckle 37 form vertical shoulders above and below this horizontal knuckle or tongue.

Figure 5:
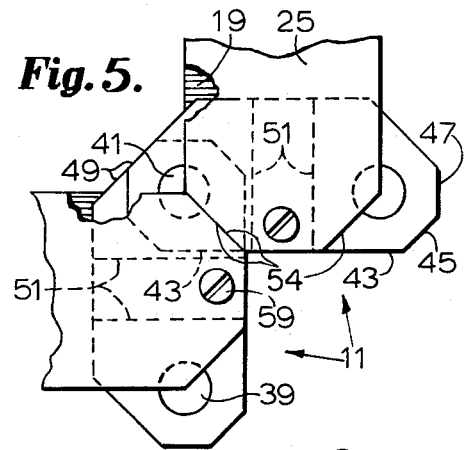
FIG. 5 is a bottom view similar to FIG. 4 showing two joined links and portions of attached display frames in orthogonal position.

With reference to FIG. 5, it can be seen that when a display frame is pivoted with respect to another about their common pintle 41, the leading face 43 of each of the links 11 and the facets 45 and 47 of the knuckles may pass very closely to the walls 51 of the central body portion 53. The excursions of the face 43 and the facets may be less than shown and surfaces of the knuckles may be curved as long as clearance is provided. It is apparent that there should be close tolerance between the tongues 37 and the grooves formed by knuckles 35, and that maximum stability is achieved by the greatest practicable surface contact of tongue and knuckles forming the groove in the linkage.

Each of the lugs 25 has been cut away to form a pair of stop shoulders 54. Each shoulder 54 is beveled at an angle of 45° with the side of the lug 25, which in turn is an extension of the vertical side 19 of the frame 13. As such, the shoulder 54 is also beveled at 45° to a planar display face of the frame. The apex of the angle formed at the junctions of each beveled stop shoulder 54 with the projected side of the end 19 of the frame is aligned with center of a bore 39, assuring that the planar display faces lie flush when unselected or when two or more frames have been transported fully through the display position.

When a frame 13 is pivoted on its pintles 41 until an angle of 90° is reached between adjacent display faces on the frame, the stop shoulders 54 on the adjacent frames abut, determining both the maximum angle between the frames and the display position. If a frame 13 has preceded the displayed frame through the display position, the pair of shoulders 54 on the displayed frame will act to hold the planar faces of the displayed frame orthogonal to the planar faces of the immediately preceding and succeeding frames. This orthogonal position will be maintained until a preceding or succeeding frame is allowed to pivot as hereinafter described.

It is apparent that the lugs 25 need not be integral extensions of the horizontal sides of the frame. Such a lug can be affixed to the inward vertical side 17 at any convenient position as long as the lugs are aligned on the several frames as stop means for the purposes described. Likewise, the stop surfaces may be integral portions of the links themselves.

Figure 2:
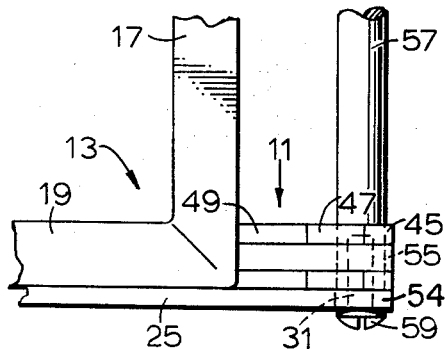
FIG. 2 is a side elevational view of the preferred embodiment of a link of the articulated member and a portion of a display frame secured to the link and having an associated plate with beveled shoulders as stop means.
Figure 3:
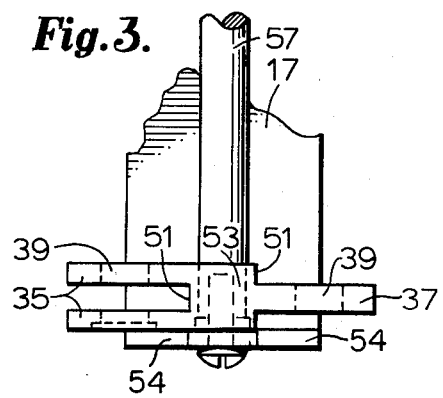
FIG. 3 is a front elevational view of the combination shown in FIG. 2.
Figure 4:
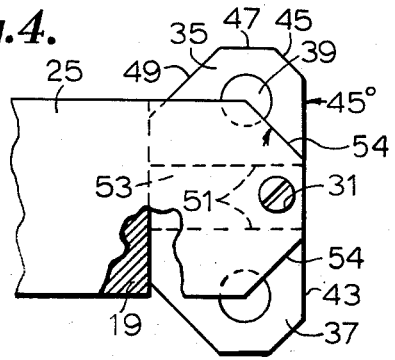
FIG. 4 is a bottom view, broken in part, of the structure shown in FIG. 2.

In FIG. 2 the lug 25 is illustrated as an extension of a plate forming the outer surface of the horizontal end 19, the plate and its extension forming a stop plate. A circular aperture 31 is centered between the beveled stop shoulders 54 of the stop plate. As shown in FIGS. 2 and 3, the central portion 53 of each link 11 has a bore 55 concentric with the aperture 31 in the stop plate 25. The diameter of the end of the bore adjacent the stop plate is the same as that of the aperture 31, whereas the diameter of the remainder of the bore is larger, thus forming an annular shoulder or seat in the link 11 proximate the stop plate. Passing between the pair of upper and lower links on each frame and seating in their bores 55 is a rod or spindle 57. The end of each spindle may be tapped so that the shank of a bolt 59 can pass through the aperture 31 into the bore 55 and thread into the tapped end of the rod to secure the rod to the stop plates via the links 11.

The primary functions of the spindles 57 are to provide additional support to the articulated members, to assist in preventing warping and sagging and to maintain the alignment of the stop plates and the hinge-links. A secondary function of the rods as a group is the establishment of a fence inward of the vertical frame sides 17. As shown in FIG. 1, several power cables 61 and numerous interframe electrical couplers 63 are laced in the passageway defined between the rods 57 and the inward vertical sides 17. Although the rods assist in confining the various cables and couplers to a specific area, they do not overly limit access to it. The inward vertical sides are perforated to allow the entrance of the cables, and may be fitted with printed circuit connectors and terminal posts so as to reduce the amount of intraframe wiring. Both the power cabling and the interframe coupling should be slack enough to allow not only for the swinging and linear translation of the frames, but also for the insertion of additional frames, as hereinafter described.

Although two articulated members are illustrated and described as supporting the display frames at their top and bottom in the preferred embodiment, in certain applications in which the size, weight, and configuration of the frame and its contents allow, only one articulated member need be provided. For ease of presentation, the following description will assume that only a single link and associated stop means are provided for each frame.

Figure 7:
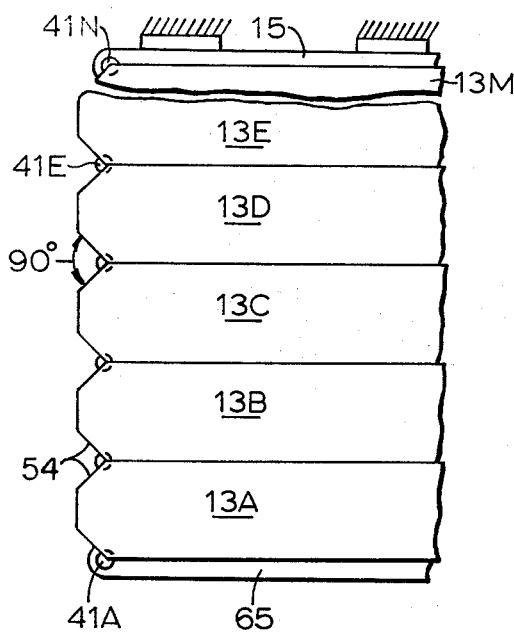

For ease in fabricating a complete display assembly, the links 11 and stop means 25 are first attached to the individual frames. A frame, such as 13M, is then positioned next to another frame, such as 13L, so that the tongue 37 of its link 11 is inserted in the groove between the two knuckles 35 of the link of the adjacent frame with their bores 39 aligned as in FIG. 1. When the links of these two adjacent display frames are so positioned, a pintle 41M is passed through the aligned bores 39. Similarly, the frame 13K is joined to the frame 13L and the frame 13J is joined to the frame 13K by the pintles 41L and 41K, respectively, until all the frames are joined by their respective hinge-links and pintles as depicted in FIG. 7. Thus, the individual links are joined by pintles to form close fits in a single articulated member supporting the individual wings. Each hinge-link 11 shares two pintles 41 which provide two spaced-apart pivot points, each juxtaposed to stop shoulders 54 associated with the hinge-links of two adjacent frames.

In the closed position of FIG. 7, all the links lie in a straight line and all the frames lie parallel to one another like a row of books. The edges of the sides 17 and the ends 19 forming the planar display faces of one frame fit flush against those of the next frame so as to bar the entrance of dust or other deleterious matter. The frames also tend to shield their contents electrically from the rest of the computer apparatus, as well as from one another. To augment both of these packaging advantages, it is desirable to secure a front cover plate 65 to the front of the first display frame 13A. The front cover plate 65 is hinged to the link attached to the frame 13A and the rear cover plate 15 is hinged to the link attached to the frame 13M by the pintles 41A and 41N, respectively, in a manner similar to the above-described joining of the display frames 13L and 13M. It is to be noted that the links to which the cover plates are secured utilize only the knuckle on one side of their body portion; therefore, these links could be modified accordingly. Also, the cover plates do not carry the stop plates 25; therefore, the stop means do not apply to the angle of pivot between the cover plates 15, 65 and the frames respectively adjacent thereto.

Since the links 11 are joined by close fitting tongue and groove connections, with pintles in aligned bores, and the frames are rigidly attached thereto, the weight of the frames being borne by the articulated member, the interlinked frames, when positioned side by side, will extend forwardly from the anchored rear cover plate 15 without the tendency to sag or buckle and will be free to swing with ease about the pintles 41. In heavier embodiments the use of two articulated members and the spindles 57 will add to this stability.

To insure the flush fit between the frames and to prevent undesired pivoting of the housings, latching members 67 are provided as shown in FIG. 1. Each latch comprises a resilient tab 69 which is preferably secured near one of its ends to the outward side member 17 of a display frame by a pair of studs 71 having raised cylindrical heads. The other end of the tab 69 is flared slightly outward and has two perforations 73 which have the same spacing as and slightly larger diameters than the heads of the studs 71. As two frames are brought into position adjacent one another, such as the frames 13A and 13B illustrated in FIG. 1, the flared end of the latch tab 69 on the frame 13B will cam outwardly upon the raised heads of the studs 71 on the frame 13A until the perforations 73 are aligned above the studs. The resilient latch tab 69 will then spring inwardly, thus carrying its perforations 73 over the heads of the studs 71 to seat therearound and latch the frames to each other.

To release a latched pair of frames, the flared end of the latch-tab interconnecting the pair may be manually sprung outwardly until its perforations clear the heads of the associated studs; thereafter, a slight divergent pivoting of one or both of the previously latched frames about their common pintle will provide sufficient clearance therebetween to prevent accidental relatching.

In some computer applications it may be considered desirable to mount the entire hinged display assembly so that it can be stored within the framework of the computer cabinetry when access is not required, and subsequently be projected forward from the cabinetry when inspection of the contents of one or more of the display frames is necessary. This dual positionality can be accomplished by securing the anchored rear cover plate 15 to a carriage utilizing a track, not shown. The mounting mode will of course depend in part upon the size and weight of the display assembly.

A further consideration is the dissipation of the heat formed by the normal operation of the computer components and subassemblies 23 which are mounted on the panels 21 in the display frames. Under normal operating conditions the frames will be locked together by the latches 67. Hence, dissipation would be limited to conduction via the sides 17 and ends 19 of the frames, which for many applications might be inadequate. It is therefore recommended that the hinged assembly be coupled to the forced air cooling system typical of most electronic computers, and that the panels 21 be provided with sufficient interstices to allow the free movement of air therethrough.

The operation of the subject hinged display assembly will be explained with reference to the successively illustrated FIGS. 7–11, using the embodiment of FIG. 1. Though not mentioned in each particular instance, it will be assumed that as any frame or cover plate is being pivoted away from an adjacent frame or cover plate, the appropriate latch member 67 is released. Also, it will be assumed that when the frames and cover plates return to a flush relationship, they will again become latched.

It will be recalled that the stop shoulders 54 lie at an angle of 45° with sides of the lug 25 and that they are also at an angle of 45° with the planar faces of the display frame. Thus, the maximum angle that can lie between the stop shoulders 54 on two aligned adjacent display frames is 90°, the sum of the fixed 45° bevelings of the stop shoulders. This maximum angle arises, as shown in FIG. 7, when two display frames, such as 13C, and 13D, lie flush against one another and their links 11 lie in a straight line.

As a direct result of the maximum 90° angle between stop shoulders 54 of adjacent display frames, one frame can swing through a maximum arc of 90° before the stop shoulders associated with its links abut the stop shoulders associated with the upper and lower links of an adjacent display frame. As shown in FIG. 8, the most forward frame 13A has been swung about the pintles 41B until the rearward stop shoulders associated with its hinge-links 11 abut the forward stop shoulders associated with the links to which the frame 13B is attached. Assuming that the front cover plate 65 is also swung open about its pintles 41A to any desired angle, which may be greater than 90° as heretofore explained, the components and subassemblies 23 mounted on the forward and rearward faces of the panels 21 of the display frame 13A and the forward face of the panel of frame 13B are easily accessible for maintenance operations.

After completing maintenance of the contents of the accessible panel faces of the frames 13A and 13B, the frame 13A must be moved away from, and the frame 13B placed into, the displaying orientation so that the rearward facing contents of the frame 13B and the forward facing contents of the frame 13C can be examined. To achieve this repositioning, a pivotal force is applied to the frame 13A as if to swing it farther from the frame 13B. Since the stop shoulders 54 associated with the links supporting the frames 13A and 13B and adjacent the pintles 41B are already abutting, the applied force is transmitted to the hinge-links supporting the frame 13B to cause it to swing about its pintles 41C until the frame 13B is at right angles to the frame 13C, at which time the adjacent stop shoulders associated with the frames 13B and 13C also abut one another. Thus, as shown in FIG. 9, the display frame 13B is now fully accessible as was the frame 13A in FIG. 8, and the frame 13A has been displaced 180° from its original position shown in FIG. 7.

Of considerable importance is the fact that during its transposition from FIG. 7 to FIG. 9 the display frame 13A has also been translated rearwardly a distance equal to the total depth of the two display frames 13A and 13B which is the distance that lies between the pintles 41A and 41C when their links 11 lies in a straight line. That there has been a linear translation can be seen easily by comparing FIG. 7 with FIG. 9 and by noting that in FIG. 7 the frame 13A is two positions forward of the frame 13C, whereas in FIG. 9 the frames 13A and 13C are aligned and extend the same distance forward of the anchored rear cover plate 15. A comparison of FIGS. 8 and 9 additionally shows that the fully displayed frame 13A extends farther forward in FIG. 8 than the fully displayed frame 13B in FIG. 9 by a distance equal to the depth of the frame 13B.

Likewise, to place the frame 13C in the fully displayed position of FIG. 11, a force is applied to the frame 13B, as positioned in FIG. 9, as if to swing it in the direction of the frame 13A. The stop shoulders 54 associated with the links supporting frames 13B and 13C proximate their common pintles 41C are already abutting since the hinge-links and their frames are orthogonal; therefore, these stop shoulders will maintain the 90° angle between the longitudinal axes of these two hinge-links and their frames until the orientation of FIG. 11 is reached. The stop shoulders associated with the frames 13A and 13B proximate the pintles 41B are abutting as above described; hence, part of the motive force applied to the frame 13B is transmitted to the frame 13C which thereupon swings upon the pintles 41D into the displaying position and also part of the force is transmitted to the frame 13A which thereupon is linearly translated rearwardly.

Thus, as seen in FIG. 11, the act of displaying the frame 13C has caused the frame 13A to be linearly translated another two positions rearwardly, the total depth of the frames 13B and 13C, such that it is now aligned with the frame 13E. The frame 13B has also been translated two positions rearwardly of its initial position, as shown in FIGS. 7 and 8, by a distance equal to the sum of the depths of the frames 13B and 13C and is now aligned with the frame 13D. Once aagin, the displayed frame, now the frame 13C, extends farther rearward than its predecessors, the frames 13A and 13B, when they were in display position.

A mathematical approach to the arcuate swinging of a frame from its initial position to and through the displaying position, such as the frame 13A, as it is transposed from the position of FIG. 7 to that of FIG. 9, is reflected by the formula $X = \pi(2L+D)/2$ wherein:

$X$ = length of the arcuate path followed by a point "$p$" on the outward edge of a frame when that frame is transposed 180° as shown in FIG. 12 with reference to the frame 13A;

$L$ = the length of that frame; and $D$ = the depth of the frame then in the displayed position, in this instance the frame 13B.

This formula is derived from substituting into the basic geometric statement that the circumference $C = 2\pi r$. Since in the first 90° of arc length, which is generated from the pintle 41B as shown in FIG. 12, the radius equals the frame length L, that arc length equals $\pi L/2$. In the second 90° of arc length, the radius is generated from the pintle 41C; therefore, the radius equals the frame length L plus the frame depth D. Hence, that arc length equals $\pi(L+D)/2$. The sum of the two 90° arc lengths, therefore, is the above-presented $$X = \pi(2L+D)/2$$

As seen in FIGS. 9 and 11, the depth of the fully displayed frame, i.e., the distance between the centers of its bore 39, controls the maximum distance between the inward sides 17 of the aligned adjacent frames, such as the frames 13A and 13C in FIG. 9, as well as the frames 13A and 13E, and the frames 13B and 13D in FIG. 11.

As shown in FIG. 10, which depicts the transitional position between FIGS. 9 and 11, the distance between the inward sides 17 will be increased temporarily during the time that the pivotal force applied to the displayed frame to transpose it past the displaying position is being transmitted to the next rearward frame as well as he previously displayed frame. As shown in FIG. 10, the stop shoulders 54 adjacent the pintle 41C remain abutting, thus causing their associated frames 13B and 13C to maintain their orthogonal relationship; whereas, the stop shoulders adjacent the pintle 41B are no longer abutting, as they were in FIG. 9, and are pivoting through an angle which, as shown in FIG. 11, will become 90°, thus causing their display frames 13A and 13B to lie parallel to each other. Hence, during the interium between FIGS. 9 and 11 as shown in FIG. 10, there will be a slight indulatory movement of the previously displayed frame.

The subsequent acts of serially displaying the frames 13D–13M, by applying a pivotal motive force to the serially displayed frames 13C–13L will each cause the frame initially rearward of the displayed frame to pivot 90° upon the rearward pintle of each of its hinge-links until the display position is attained and will cause the frames initially forward of the displayed frame to translate linearly rearward a distance equal to the depth of two of the frames, until all of the hinge-links lie one behind the other with their pintles in a straight line rearward of the pintle 41N which secures the frame 13M to the rear cover plate 15, thereby causing their display frames to lie flush with each other. Though not shown as a separate figure, this final position would be the same as if in FIG. 7 the frames and front cover plate were maintained latched while the latch 67 holding the frames 13M to the rear cover plate 15 were released and the entire assembly pivoted as a single unit 180° about the pintle 41N.

As previously stated, the power cables 61 and the interframe electrical coupling 63 are loosely laced between the inward vertical side members 17 and the support rods 57; therefore, they are of ample length to permit a continuous flow of electricity to the contents of the display assembly as the frames translate as shown in FIGS. 8–11.

Since both the serial displaying of the frames 13A–13M and the swinging of the entire display assembly as a unit results in the same final position, it is correct to assume that any combination of adjacent display frames can be transposed from its initial position into and past the display position in the same manner as the above-described serial transposition of the frames 13A and 13B. The only significant differences between serial transposition of frames and group transposition are that serial transposition requires several one-step operations whereas group transposition requires a single two-step operation, and that during group transposition an increased distance will lie between the inward vertical sides 17 of two aligned, oppositely disposed frames.

As an example of group transposition, the frame 13E can be moved into the display position by a two-step operation subsequent to the orientation shown in FIG. 8. First, the latches 67 holding the frame 13E to the frames 13D and 13F are released and a pivotal force is applied to the frame 13A to cause the unit comprising the frames 13B–13D to pivot forward upon the rear pintles 41E of the hinge-links 11 supporting the frame 13D until the three-frame unit is moved into the display position and the frames 13A and 13E are opposite each other, similar to the positions shown in FIG. 11. Now, however, the distance between the inward sides 17 of the frames 13A and 13E is controlled by the total depth of the three frames 13B–13D. Next, the frame 13E is brought into the displaying position by applying a pivotal force to the three-frame unit, swinging it upon the rear pintles 41F of the hinge-links supporting the frame 13E toward the frame 13A, thus causing a coaction between the rearward stop shoulders 54 of the hinge-links supporting the frame 13D and the forward stop shoulders of the hinge-links supporting frame 13E. Simultaneously, proximate their common pintles 41B, there is a coaction between the abutting stop shoulders of the hinge-links supporting the frames 13A and 13B which causes the frame 13A to translate rearwardly the depth of the four frames 13B–13E, as well as to move toward the inward side 17 of the frame 13I, such that, when the frame 13E reaches the display position, the frame 13A will be aligned with the frame 13I and separation therebetween controlled by only the depth of the frame 13E. Accordingly, the frames 13B–13D are respectively aligned with the frames 13H–13F.

The foregoing description of the displaying of the hinge-linked frames was consistently directed to the displaying of the frames from the foremost to the rearmost, either serially or by use of grouped frame units. It should now be apparent to those skilled in the art that since each of the links, their stop means, and the display frames they support are all respectively similar, frames can be transposed into the displaying position from either direction by applying a motive force to the displayed frame to pivot it in the corresponding direction. Hence, by applying a force to a displayed frame or unit to return it to its initial location, as in pivoting the frame 13B from the position of FIG. 9 back to the position in FIG. 8, the retrieval of a previously displayed frame can be accomplished—in this example, the frame 13A. Thus, a particular frame is easily accessible no matter where it is at a given time and also, the assembly can be returned to the closed position of FIG. 7 in a two-step operation by the use of group transposition as above outlined.

Figure 6:
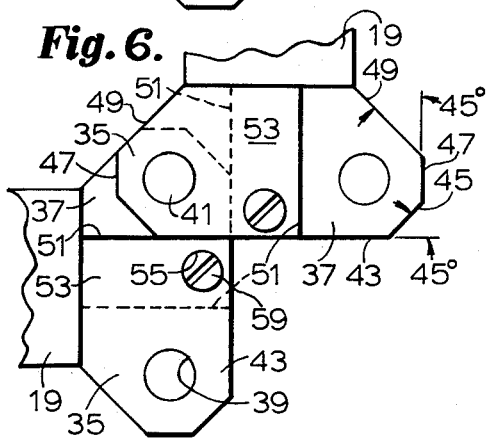
FIG. 6 is a bottom view of a second embodiment of this invention in which the stop means comprise portions of the tongue and grooves of adjoining links.

It is inherent in the structure of applicant's link 11 that the leading edge of the tongue 37 will abut the innermost wall 51 of the body portion of the link at some point after a link has pivoted substantially 90° with respect to an adjacent link. Likewise, the surfaces 51 forming shoulders above and below the tongue 37 may abut the leading faces of the knuckles 35 forming the horizontal groove of the adjacent link. The leading faces 43 and the surfaces 51 may, therefore, be dimensioned to form stop means for establishing a display position and for transmitting force to succeeding links as hereinbefore described. As illustrated in FIG. 6, these surfaces have been dimensioned to limit the angle of arc to substantially 90°.

It is, of course, to be understood that whenever the above description of the operation of the preferred embodiment of the stop means refers to the abutting stop shoulders associated with the links of adjacent display frames, or to other stop shoulder relationships and the resulting coaction, transposition, or translation, the reference should be applied, respectively, to the leading face 43 and the surfaces 51 of the central body portion of two adjacent links when the alternative embodiment is used. When the lugs 25 are not used in the alternative embodiment of the stop means, the head of the bolt 59 will lie against the bottom of the bore 55 of the link 11 so as to secure the rod 57, whereas previously the stop plate lay between the bottom of the bore and the head of the bolt.

The first-described embodiment of the stop means, including the stop plates 25, is preferred since the plates increase the rigidity and stability of the hinged display assembly and the stop shoulders are less subject to wear. Also, stricter manufacturing tolerances would be required for the face, facets and walls of the hinge-links of the alternative stop means.

Applicant's display assembly is particularly useful with modular type of housing of electronic components. Since the links of applicant's articulated members are identical and joined to adjacent links by only the pintles 41, it is relatively easy to manipulate the display frames in the assembly in a modular manner by removing certain pintles and adding, eliminating or substituting selected frames and then reuniting the assembly with the appropriate pintles.

Not only would the modular characteristic of this assembly be instrumental in reducing the maintenance "down time" of the computer but it could also be of particular advantage in the initial fabrication of the associated portion of the computer system. During fabrication, the rear cover plate 15 could be mounted to a fixture, not shown, the contents of each display frame could be respectively installed and tested, and then the frames could be sequentially mounted, electrically intercoupled, and tested in relation to one another at which time the entire hinge-linked assembly including front and back cover plates, couplers and power cables could be removed from the fixture and easily installed into the computer.

Applicant's invention has been illustrated herein as including stop means for limiting to 90° the arc through which a frame can be pivoted upon its hinge-link or set of hinge-links before linkage coaction arises. However, it is not intended that the invention be confined to a structural cooperation which produces only the described 90° arc and establishes a display position wherein the planar faces of the displayed frame are orthogonal to the planar faces of the preceding and succeeding frames. Other angular relationships could be used to produce different arc and angle limits without departing from the fundamental novel features of the invention. It is apparent, for example, that the stop shoulders 54 can be beveled at any desired combination of angles within the capacity of the links 11.

Additional changes and substitutions in the form and details of this invention could also be made by those skilled in the art without departing from its novel teachings, which are limited only by the following claims.

I claim:

1. A multiple wing assembly for selectively displaying from a support a plurality of like wings having display faces comprising
a pair of like, vertically spaced apart, articulated assemblies, each having one end pivotable to said support and the other end free, said assemblies comprising serially-connected tongue and groove links, corresponding links in said assemblies forming pairs,
surfaces on each of said pairs of links for fixedly mounting on the same sides thereof an individual one of said wings for arcuate display, and
stop means individual to each of said pairs of links and cooperating between adjacent pairs of links for determining the maximum arc through which any one pair of links can pivot with respect to an adjacent pair.

2. The multiple wing assembly of claim 1 wherein said stop means individual to each of said pairs of links comprises at least one lug in fixed geometric relation with said pair of links, each of said lugs having beveled surfaces thereon for abutting between lugs individual to adjacent pairs of links when said maximum arc is reached between said adjacent pairs of links.

3. The multiple wing assembly of claim 1 wherein said stop means comprise a surface on the tongue of each of said links and a surface in the groove of the link serially connected thereto.

4. The combination of claim 1 wherein said display faces are planar and on opposite sides of said wings, said links are serially connected by pintles, each having a longitudinal axis in a projected plane of a display face and said stop means limit said maximum arc to substantially 90°.

5. The combination of claim 1 and additionally including spindles one of which is journalled into and lying between each of said pairs of links, and spaced from said sides thereof for fixedly mounting said wings.

6. The combination of claim 4 wherein said wings are vertical, substantially rectangular frames with said planar display faces being parallel, said frames are mounted on said pairs of links and said stop means are extensions on the upper and lower sides of said frames, said extensions being aligned from frame to frame and each having at least one surface beveled back from the plane of a said planar display face at an angle of substantially 45° thereto.

7. The combination of claim 6 wherein said aligned extensions each has a pair of said beveled surfaces and said extensions tend to maintain any selected frame in display position substantially orthogonal to the next preceding and next succeding frame.

8. The combination of claim 7 wherein said aligned extensions on said rectangular frames are integral with at least one of the horizontal ends thereof, and the angle of intersection of each of the planes of said display faces and the surface of the extension beveled back therefrom is on the longitudinal axis of a pintle.

9. The combination of claim 4 and additionally including means for automatically and releasably latching unselected wings serially one to the other and for automatically and releasably latching wings which have pivoted through said maximum arc serially one to the other.

10. An apparatus for supporting a plurality of frames for arcuate movement through a display position comprising:
a plurality of links, each having a tongue on one side and a groove on the opposite side,
said opposite sides having aligned pintle receiving bores determining the longitudinal axis of each said link,
said links being serially fitted together tongue in groove in close tolerance for movement in a single plane perpendicular to said bores,
each of said links being adapted to fixedly support a frame perpendicular to said plane of movement, and
stop means individual to each of said links coactably limiting the maximum angle between the longitudinal axes of every two successive links to substantially 90°.

11. An apparatus according to claim 10 wherein:
said stop means comprise a pair of raised surfaces on each of said links,
said raised surfaces diverge toward different ones of said bores and are at an angle of substantially 45° to said longitudinal axis, and
the points of maximum divergence of said raised surfaces are aligned with the centers of said bores.

12. An apparatus for supporting a plurality of frames for arcuate movement through a display position comprising
a plurality of links, each having a horizontal tongue on one side and a horizontal groove in the opposite side,
said opposite sides having aligned pintle-receiving vertical bores determining the longitudinal axis of each of said links,
said links being serially fitted together tongue in groove in close tolerance for movement in a horizontal plane only,
each of said links having a surface on a like side for fixedly mounting a frame perpendicular to said longitudinal axis, and
stop means associated with each of said links and cooperating between links for limiting the maximum angle between the longitudinal axes of every two successive links to substantially 90°.

13. A display apparatus comprising
at least one articulated assembly having one end pivotable to a support and the other end free, said assembly including serially and pivotally connected tongue and groove links,
a plurality of like, rectangular housings, each fixedly mounted on one of said links to pivot therewith, and
stop means individual to each of said links and cooperating between adjacent links for determining the maximum arc through which any individual housing is pivotable as defined by the formula $\pi(2L+D)/2$, wherein $L$ and $D$ are, respectively, the length and depth of one of said housings.

14. A display apparatus comprising
at least one articulated assembly having one end pivotable to support and the other end free, said assembly including serially and pivotally connected tongue and groove links,
a plurality of like, rectangular housings, each fixedly mounted on one of said links to pivot therewith, said housings being pivotable in groups, and
stop means individual to each of said links and cooperating between adjacent groups for determining the maximum arc through which any group of said housing is pivotable as defined by the formula $\pi(2L+yD)/2$, wherein $L$ is the length of each housing, $D$ is the depth of each housing, and $y$ is the number of housings in the group being transported.

References Cited by the Examiner

UNITED STATES PATENTS

| 722,568 | 3/1903 | Davy | 211—48 |
| 2,584,255 | 2/1952 | Brown | 211—169 |
| 2,928,555 | 3/1960 | Childs et al. | 211—169 |

CLAUDE A. LE ROY, *Primary Examiner.*

J. PETO, *Assistant Examiner.*